United States Patent [19]

Pentz et al.

[11] 3,807,560
[45] Apr. 30, 1974

[54] METHOD AND APPARATUS FOR REMOVING SOLIDS

[75] Inventors: Howard L. Pentz; Chandrakant Parkhani, both of Lansdale; Frank Majeron, Philadelphia, all of Pa.

[73] Assignee: FMC Corporation, San Jose, Calif.

[22] Filed: Jan. 12, 1972

[21] Appl. No.: 217,378

[52] U.S. Cl. .................... 210/83, 210/112, 210/527
[51] Int. Cl. ............................................ B01d 21/02
[58] Field of Search ........ 137/140, 142, 150, 150.5, 137/152, 153, 577, 590; 210/66, 67, 96, 103, 104, 83, 197, 523, 525, 527, 529, 530, 531

[56] References Cited
UNITED STATES PATENTS

| 3,669,271 | 12/1972 | McGivern | 210/527 X |
| 2,236,128 | 3/1941 | Pode | 210/531 |
| 2,966,268 | 12/1960 | Lind et al. | 210/83 |
| 3,128,786 | 4/1964 | Badgett | 210/96 X |
| 3,106,933 | 10/1963 | Kloppel | 210/96 X |

Primary Examiner—Samih N. Zaharna
Assistant Examiner—Robert H. Spitzer
Attorney, Agent, or Firm—Dressler, Goldsmith, Clement & Gordon, Ltd.

[57] ABSTRACT

A method and apparatus for removing a varying depth layer of settled solids from the bottom of a sedimentation tank is disclosed. The apparatus includes a plurality of spaced eduction means supported on a bridge that is movable transversely between spaced inlets and outlets for the tank to remove settled solids from associated zones in the tank bottom. The apparatus further includes first means associated with each eduction means for providing a range of flow capacity between a minimum and a maximum for each zone and second means associated with each eduction means for adjusting the flow of sludge through the eduction means to remove all deposited solids from each zone during each pass of the bridge. A sensing mechanism cooperates with the second means to maintain a substantially uniform solids concentration in the sludge being removed by the respective eduction segments.

8 Claims, 5 Drawing Figures

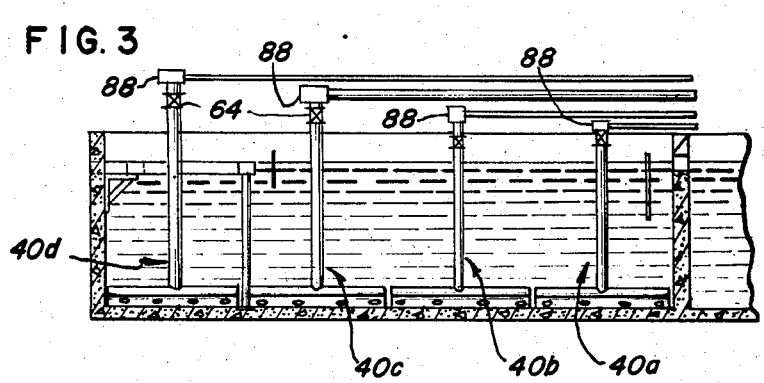
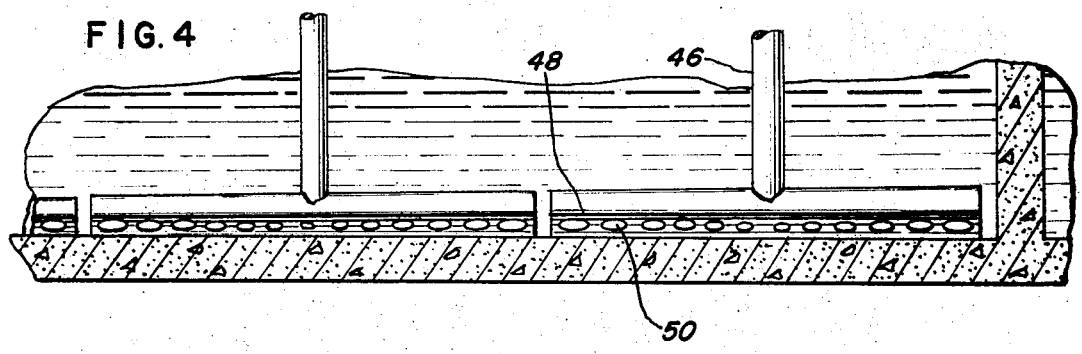
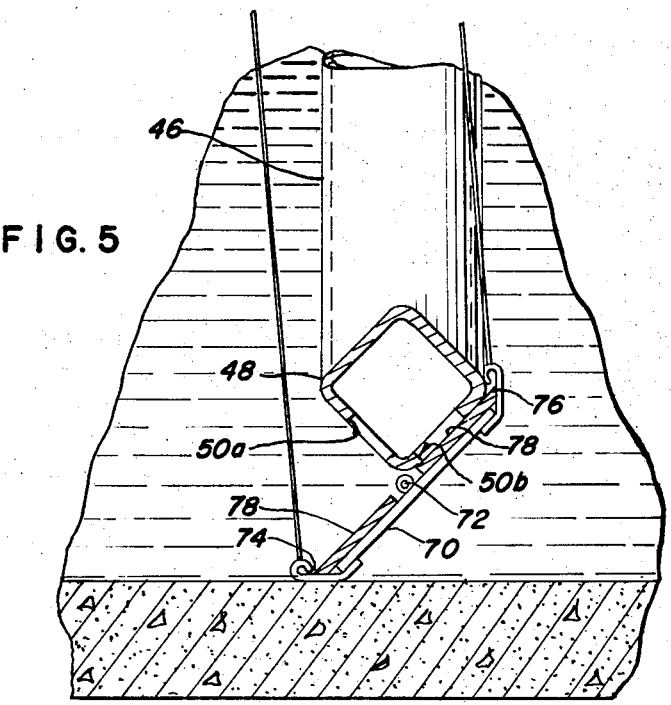

METHOD AND APPARATUS FOR REMOVING SOLIDS

BACKGROUND OF THE INVENTION

In the treatment of sewage or the like, it is customary to utilize clarification or sedimentation tanks to effect separation of liquids and solids during the sewage treatment operation. In many instances, the solids that are collected are returned to an aeration tank for further processing and treatment.

In one known process, the solids that are normally removed from the mixed liquor are deposited by gravity on the bottom of the clarification or sedimentation tank, then are removed through a scraping process in which scrapers are utilized for moving the sludge layer to a return hopper. In other instances, the sludge is withdrawn at substantially the point of solid deposit through positive flow eduction means that are moved along the tank bottom. Examples of the latter type of solids or sludge removing apparatus are shown in Poole U.S. Pat. No. 2,236,128; Lind et al., U.S. Pat. No. 2,966,268, and McGivern et al., U.S. Pat. No. 3,333,704.

In the Poole apparatus, a plurality of inverted T-shaped tubes depend from an elongated trough that is rotated about the center of a sedimentation or sewage tank. The sludge is removed from various portions of the circular tank by varying the flow rate through each of the individual inverted tubes through the adjustment of a weir associated with the upper end of each tube to thereby adjust the hydrostatic pressure differential for each tube individually.

McGivern et al., discloses a very similar arrangement for removing sludge from the bottom of a rectangular tank in which a siphon process is used and the effect of each individual siphon can be varied by changing the speed of movement of a reciprocating carriage and by varying the level of the siphon outlet relative to the liquid level in the tank.

However, such arrangements have not been found satisfactory and have found limited commercial success to accommodate variations in the sludge layer depth pattern at different locations along the tank bottom.

The shortcomings of structures of the above type become even more acute in present day sewage treatment plants where rectangular tanks have become increasingly more common. In many instances, it is necessary to install extremely large rectangular tanks to accommodate the large amount of waste that must be treated in a normal treatment facility. In one such type of installation, the mixed liquor, consisting of liquid with entrained solids, is delivered to one end of the tank and flows toward the effluent or outlet end while solids are deposited on the tank bottom. In many installations of this type, it becomes desirable to collect the settled solids by traversing a bridge transversely of the direction of flow of liquid in the tank. Because of the extreme variations in the depth of the sludge layer in the bottom of the tank between the inlet and outlet, it has not been possible to accurately control the flow of materials from the tank and withdraw all of the settled solids from the tank bottom by adjustment of the sludge flow rate through the use of weirs or similar arrangements. Furthermore the problem becomes even more acute when attempting to withdraw sludge of substantially uniform solid concentration from all areas of the tank. This is many times desirable to increase treatment efficiency in sewage treatment plants.

With solids or sludge withdrawal means heretofore utilized, it is not uncommon to have certain portions of the sludge removal apparatus withdrawing less than the entire layer of the sludge from the bottom of the tank while other portions are withdrawing the entire layer as well as a large amount of the clarified liquid in the tank.

SUMMARY OF THE INVENTION

According to the method of the present invention, settled solids deposited in a varying sludge depth layer on the bottom of a sedimentation tank are removed while a substantially uniform solids concentration is maintained in the sludge that is removed from the tank. This is accomplished by reciprocating an eduction means transversely of the flow of liquid between the inlet and outlet ends of the tank and dividing the eduction means into individual segments that are aligned with each other and remove settled solids from respective zones in the tank. A substantially uniform solids concentration in the sludge is maintained in the eduction means by varying the range of flow capability through each of the eduction segments to accommodate variations in depth of the sludge layer in the associated zone and controlling the flow through each of the eduction segments to thereby remove the entire layer of sludge in each zone during each pass of the eduction means along the tank bottom, uniform solids concentration being defined as a constant ratio of solids in the sludge by weight.

In the specific embodiment illustrated, each eduction segment consists of a vertical tube defining a first passageway and a horizontal tube defining a second passageway with the horizontal tube having a plurality of spaced openings for receiving sludge. The range of flow capability through each segment may be varied by (1) varying the size of the vertical passageway, (2) varying the size of the horizontal passageway, and (3) varying the combined total area of the openings in the respective horizontal tubes, or (4) any combination of the previous three. With such an arrangement, the minimum and maximum sludge flow capacity through each eduction segment from its associated zone may be set to accommodate removal of all of the settled solids from the associated zone. The actual sludge flow through each of the eduction segments is then adjusted by controlling the flow from each of the eduction means so as to remove all of the deposited solids from each of the zones during each pass of the eduction means while maintaining a substantially uniform solids concentration in the sludge being withdrawn. The flow of sludge is preferably controlled by sensing the amount of solids in the sludge layer in each segment and controlling the flow rate to maintain a substantially uniform concentration of solids in the sludge flowing from the respective segments.

The apparatus for performing the above consists of a bridge that is movable transversely between the inlet and the outlet ends of the tank with the respective eduction means supported on the bridge and extending to the bottom of the tank. Each eduction segment has a horizontal portion that removes material or sludge from a zone along the tank bottom where solids are deposited.

BRIEF DESCRIPTION OF SEVERAL VIEWS OF DRAWINGS

FIG. 3 is a transverse sectional view through the tank showing a slightly modified form of eduction means;

FIG. 4 is an enlarged fragmentary view similar to FIG. 3 showing the details of eductor segment; and FIG. 5 is an enlarged transverse section showing the details of the eductor segment.

DETAILED DESCRIPTION

Figure 1:
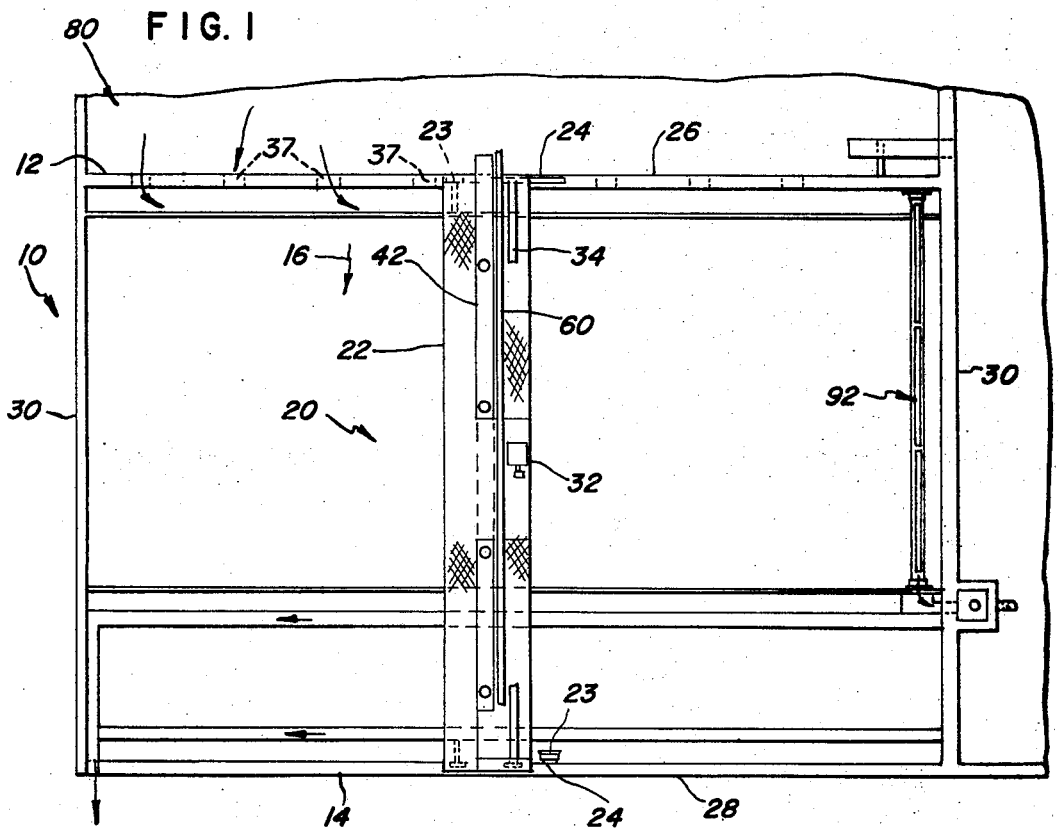
FIG. 1 is a fragmentary plan view of a tank having a traveling bridge supported thereon.

While this invention is susceptible of embodiment in many different forms, there is shown in the drawings and will herein be described in detail several embodiments, with the understanding that the present disclosure is to be considered as an exemplification of the principles of the invention and is not intended to limit the invention to the embodiments illustrated.

FIG. 1 of the drawings discloses a sedimentation tank 10 that has an inlet or influent end 12 for receiving liquid with entrained solids and an outlet or effluent end 14 for receiving clarified liquid. The liquid with the entrained solids generally flows in a direction indicated by the arrow 16 while solids are deposited by gravity on the tank bottom 18.

In most sedimentation or clarification tank constructions, the depth of the sludge deposited on the tank bottom or the solids concentration in the sludge at any one position of the tank bottom is a function of the sludge layer subsidence profile (sludge layer depth pattern) and the time elapsed since the sludge was last removed from the specific location on the tank bottom. The sludge layer subsidence profile is dependent upon the size of the tank, the length to width ratio (the length being considered the direction of flow of the liquid in the tank) and the influent and effluent end designs. The sludge layer may be defined as the depth of settled solids and the surrounding liquid that has filled the voids between the settled solids while the sludge that is removed is a combination of a certain percentage of settled solids and surrounding or associated liquid that commingle to form a mixture with fluid properties.

With many influent and effluent end designs, it can be expected that a maximum amount of solids will be deposited on the tank bottom adjacent the inlet or influent end 12 and the amount or depth layer of solids will be a minimum at the effluent end. Thus, assuming a steady state condition where no sludge is being removed, the sludge layer subsidence profile, produced by settled solids and associated liquid, between the influent and effluent ends would have a maximum depth adjacent the inlet end and a minimum depth adjacent the outlet end.

Also, in treatment plants where a high flow rate of mixed liquor is delivered to the tank, relatively long (the distance between the inlet and outlet) tanks are required so that all of the suspended solids can be removed before the liquid enters the outlet end 14 of the tank. Thus, with relatively high flow rates of mixed liquor to the tank and with relatively long tanks, the difference in the amount of solids deposited between the inlet and the outlet ends of the tank bottom can be substantial. With large variations in the depth of the layer of solids and associated liquids on the bottom of the tank that combine to form the sludge layer, it has become extremely difficult to remove all of the settled solids from the tank bottom and to maintain any uniformity in the concentration of solids in the sludge that is being withdrawn from the tank bottom. However, according to the present invention, all of the settled solids can be withdrawn from every area of the bottom of the tank with minimum mechanical agitation thereby substantially eliminating chances of the settled solids being resuspended in the liquid. All of this is accomplished with a very simple mechanism that can be mechanically controlled.

Thus, according to the present invention, all of the sludge layer is removed from every area of the tank during a given time period while a substantially uniform solids concentration is maintained in the sludge that is removed from the tank.

This is accomplished with sludge removal apparatus 20 that consists of a bridge 22 that is movable transversely of the direction of flow of liquid in the tank 10. The traveling bridge 22 is supported by wheels 23 on rails or guides 24 that are fixed to the upper side walls 26 and 28 that define the respective inlet and outlet ends of the tank. The bridge 22 is reciprocated between opposed side walls 30 by a reversible motor 32 that rotates a shaft 34 through a pulley with the wheels 23 secured to the opposite ends of the shaft.

As clearly shown in FIG. 1, side wall 26 or longitudinal wall has spaced openings 37 defining the inlet means and longitudinal walls 26 and 28 are substantially longer than transverse walls 30 so that the rectangular tank is substantially narrower between the longitudinal walls.

Figure 2:
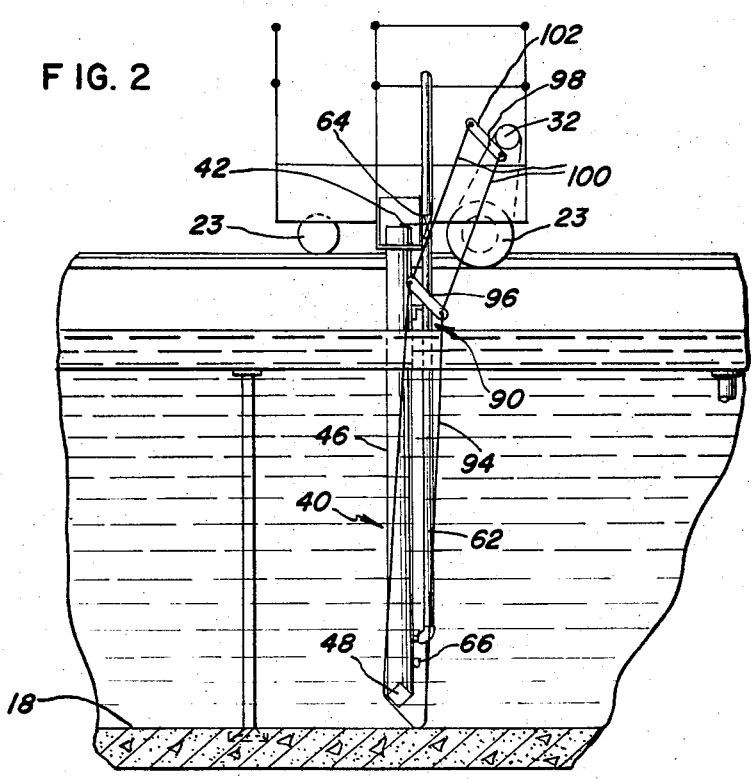
FIG. 2 is a side elevation view of the traveling bridge showing the eduction means associated therewith.

The bridge 22 supports eduction means in the form of a plurality of spaced eduction segments 40 (FIG. 2) that are supported on the bridge and remove settled solids from associated zones in the tank bottom. The eduction means further includes a trough 42 on the bridge 22 with the plurality of eduction segments 40 cooperating with the trough at spaced locations along the bridge 22. Each of the eduction segments consists of a vertical tube 46 defining a first passageway and a horizontal tube 48 defining a second passageway and having a plurality of spaced openings 50 (FIG. 4) located along the length thereof.

According to the primary aspect of the present invention, each of the eduction segments has a first means associated therewith to provide a range of flow capacity between a minimum and a maximum for each zone, with the minimums and maximums being different for at least some of the respective zones. The eduction means further includes second means associated with each of the eduction segments for adjusting the rate of flow of materials through the eduction segments so that all of the deposited solids are removed from each zone during each pass of the bridge over a given area.

The first and second means associated with each of the eduction segments cooperate with each other so that a substantially uniform solids concentration can be maintained in the material or sludge that is being withdrawn from the tank regardless of the depth of the layer of sludge that has accumulated on the tank floor since the sludge was last removed. Furthermore, all of this is accomplished by removing the materials from the tank bottom at the point where the settled solids are deposited with minimum agitation to eliminate the chances of resuspension due to mechanical agitation.

The first means associated with each eduction segment to provide a range of flow capacity consists of: (1) varying the size and/or length of the vertical tube 46, (2) the size and/or length of the horizontal tube 48, and (3) the total combined area of the openings in the horizontal tube or portion of the eduction segment. Thus, for example, by varying the combined total area of the openings that is capable of receiving solids in the respective eduction segments, the minimum and maximum flow of sludge can be established, as will be described later. Additionally, if the sizes of the vertical tube 46 are varied in each of the eduction means, the amount of sludge that can be withdrawn in each eduction segment will be varied. The same would be true if the size and/or length of the horizontal tubes were varied.

By a proper combination of any one of the three changes of dimensions, any desired minimum and maximum range of flow capacity can be developed in each of the individual eduction segments. The minimum and maximum flow capabilities for the respective eduction segments will be determined by the depth of the sludge layer that is expected may accumulate on the tank bottom during the lapsed time between successive passes of the bridge over a given point.

The second means associated with the respective eduction segments for adjusting the rate of flow of materials through the eduction segments again can be of any known type so that the flow rates through each eduction segment will be such that all of the deposited solids on the tank floor are removed from each zone during each pass of the bridge. For example, in FIGS. 1 and 2, the second or hydraulic means for controlling the flow through each of the eduction segments to remove the entire layer of settled solids in each zone during each pass of the bridge consists of an air lift arrangement which has an inlet supply of air under pressure connected to a main conduit 60, with the main conduit 60 connected to each of the eduction segments adjacent the lower portion of the vertical tube through a branch conduit 62 having a control valve 64 located therein.

In order to maintain a substantially uniform solids concentration in the sludge through each of the eduction segments 40, the valve 64 is preferably of the adjustable type and the adjustment is controlled by a sensing mechanism 66 that senses the concentration of solids in the material or sludge that is withdrawn from the bottom of the tank and the sensing means is such that the valve 64 is opened and closed proportionately to maintain a uniform solids concentration in the material flowing from each eduction segment at all times.

The arrangement allows for the entire layer of settled solids to be withdrawn during each pass or reciprocation of the bridge between the opposite side walls 30 of the tank. Furthermore, the entire layer is withdrawn in a manner to maintain the solids concentration in the material or sludge uniform through each of the eduction segments.

If it is assumed that the tank is designed such that the settled solids are deposited on the tank bottom in a progressively decreasing sludge depth layer between the inlet and the outlet, the respective eduction segments will be designed such that the minimum and maximum flow capacity would be progressively decreased for each eduction segment cooperating with the respective zones defined between the inlet and outlet of the tank. For example, assuming that the eduction means 40a were designed to remove, as a mean of the flow range, X gallons per minute of sludge from the associated zone of the tank, then the eduction means 40d would be designed to remove one-fourth X gallons per minute of sludge, the eduction means 40b would be designed to remove three-fourths X gallons per minute, while the eduction means 40c would remove one-half X gallons per minute. The flow rate through each eduction segment would be determined by a combination of the amount of pressure that is developed by the air entering each of the vertical tubes 46 and the minimum and maximum range of flow capacity through each of the eduction segments 40 a through 40d.

Of course, it will be appreciated that the sensing probe or means 66 would set the flow rate through the eduction means as a function of the layer of settled solids associated with the zone of each eduction segment. Thus, if one eduction segment were removing too much liquid, the valve 64 would automatically reduce the flow rate through the associated eduction segment and thereby increase the concentration of settled solids flowing through the eduction segment.

While any number of types of eduction means could be utilized for removing the settled solids, a preferred type of simple eduction segment has been shown and will now be described. This eduction segment is specifically disclosed and claimed in our co-pending application entitled: SLUDGE REMOVAL APPARATUS, Ser. No. 217,379, filed of even date herewith and assigned to the assignee of the present invention. The subject matter of the related application which is not inconsistent with this disclosure is incorporated herein by reference.

Briefly, the eduction segment 40 (FIG. 5) consists of deflecting plate 70 that is pivoted intermediate opposite edges about a fixed pivot axis 72 located on the lower edge of the horizontal tube 48. The plate has two leading edges 74 and 76 associated therewith that are respectively directed towards the opposed side walls 30 of the tank 10. The plate also has first and second sealing means 78 associated therewith. The horizontal tube 48 has two sets of openings 50a and 50b located on opposite sides of a vertical plane extending perpendicular to the bridge 22 through pivot axis 72.

Thus, the deflecting plate 70 can be pivoted between first and second positions to seal one set of openings 50 while directing solids to the second set of openings 50 and the position of the plate or blade can be reversed when the bridge is traveling in the opposite direction so that a single horizontal eduction tube can be utilized for withdrawing settled solids as the bridge is traveling in opposite directions in the tank. Of course, it will be appreciated that various types of eduction segments could be utilized so long as the several segments cooperate with each other to span substantially the entire area between the inlet and outlet ends 12, 14 of the tank.

The sludge that is removed by each of the eduction segments 40a through 40d is deposited in the trough 42 (FIGS. 1 and 2) and the trough is designed to deliver the material to an aeration tank 80 which, in FIG. 1, has been illustrated as being located adjacent the tank 10 with the wall 26 forming a common wall between the two tanks. Of course, the material withdrawn from the sedimentation of settling tank need not be deposited directly into the aeration tank and could be delivered to the aeration tank in many other ways or delivered to other areas of a treatment plant.

According to a further aspect of the present invention, the sizes of the respective openings 50 in each horizontal tube 48 are varied in such a manner so as to maintain a substantially constant hydraulic flow rate through each of the openings in a given eductor segment. It is known that when utilizing an inverted T-shaped tube of the type described above, the pressure in the horizontal portion of the eduction segment will vary from the outer end toward the center where the vertical tube 46 is connected thereto.

In order to balance the hydraulic flow rate through each of the openings for any given flow condition, the respective openings are largest adjacent the outer end of each tube 48 and progressively decrease in size towards the center. Thus, the openings are largest where the pressure is a minimum due to flow that is caused by the air lift 60, 62.

While the openings have been shown as being of progressively decreasing size from the outer towards the middle of each tube 48, it will be appreciated, that if the vertical tube 46 were located at any other point along the axial length of the horizontal tube 48, the variation in hole size would have to be changed to compensate for this change. For example, if the vertical tube 46 were connected to one end of the horizontal tube, the openings 50 would be progressively decreased from the free end of the tube along the entire length thereof toward the opposite end where the vertical tube is connected.

The openings have been illustrated as being equally spaced and of progressively decreasing size from the outer end to the center of the tube. However, the spacing between adjacent openings may be varied so long as the size of the opening is correlated with the distance between the opening and the vertical tube 46 so that a constant hydraulic flow rate is maintained through each of the openings in the horizontal tube 48.

A slightly modified type of withdrawal or hydraulic means for producing flow in each of the eduction segments 40 is shown in FIG. 3 where an individual pump 88 cooperates with the upper end of each of the vertical tubes 46 with the control valve 64 associated with each vertical tube. The control valve 64 could again be controlled by a sensing probe 66 to vary the flow rate through each of the eduction segments as a function of the depth of the layer of solids in the associated zone of the tank. Alternatively, the control valve 64 could be controlled by sensing probes that extend to the tank bottom and sense the depth of the solids layer associated with each eduction segment to again control the flow through the eduction segment as a function of the depth of the layer of solids in the tank zone.

It is also desirable to have suitable skimming means 90 carried by the bridge to deliver floating solids or scum to a scum receiving means 92 at one side wall of the tank 30. The scum removing means 90 consists of a blade that extends between the inlet and outlet ends of the tank and is pivoted between an operative and an inoperative position. The pivotal movement of the skimming means or blade 90 may be correlated with the movement of the deflecting plates. For this purpose, the skimming means and deflecting plate are interconnected by cables 94 and a link 96. The movement of the deflecting plate and skimming plate between its two positions is accomplished by a shaft 98 that is supported for rotation about a fixed axis and is connected to the link 96 through a pair of cables 100 and a second link 102 fixed to the shaft. The shaft 98 is rotated by a reversible motor (not shown) and the motor can be actuated by a reversing mechanism (also not shown) that cooperates with the reversible motor 32 that reverses the direction of bridge travel adjacent each side wall 30. The motor may have a brake (not shown) associated therewith to hold the blade 70 and the skimming means 90 in the two positions.

The present eduction means can readily be designed to accurately remove the entire sludge layer of any sludge layer depth profile that may be developed between the inlet and outlet ends of the tank. For example, it is not necessary that the flow rate capability through each eduction means be progressively decreased between the inlet and outlet ends. If the sludge profile or sludge depth were to take any other profile, the respective eduction segments could readily be designed to compensate for such sludge depth profile.

We claim:

1. A method of removing settled solids from a rectangular tank having longitudinal dimension substantially greater than the transverse dimension with a plurality of spaced inlet openings in one longitudinal inlet wall and an outlet for clarified liquid along an opposite longitudinal outlet wall with the solids settling on the tank bottom in a generally decreasing depth layer between the inlet wall and the outlet wall, comprising the steps of flowing the liquid with entrained solids through the inlet openings toward the outlet wall while the solids settle to the tank bottom; reciprocating an eduction means transversely of the liquid flow; dividing the eduction means into individual eduction segments generally aligned with each other parallel to the flow of liquid; developing different ranges of flow capability through each of the segments to accommodate the depth of the layer in the associated zone of the tank bottom aligned with each segment; and controlling the flow through each of said eduction segments to remove substantially the entire layer of settled solids during each pass along the tank bottom while maintaining a substantially uniform concentration of solids in the material flowing through the segments.

2. The method as defined in claim 1, further including sensing the concentration of solids in the sludge flowing through each eduction segment and varying the flow through each eduction segment to maintain a substantially uniform solids concentration in the sludge flowing through the respective segments.

3. In a rectangular sedimentation tank having longitudinal and transverse walls and the longitudinal walls being substantially longer than the transverse walls, one longitudinal wall having spaced openings defining inlet means, and outlet means adjacent the other longitudinal wall so that liquid will flow between said inlet and outlet means while solids are deposited in a generally decreasing depth layer on the tank bottom, solids removal apparatus including a bridge movable transversely with respect to the direction of flow of liquid in the tank between said inlet and outlet means; a plurality of spaced eduction segments supported on said bridge to remove solids from associated zones of said tank bottom with said zones having a generally decreasing depth of deposited solids between said inlet and outlet means; first means associated with each eduction segment for providing a range of flow capacity between a minimum and a maximum for each zone; and second means for adjusting the rate of flow of materials through eduction segments between said minimum and maximum to remove substantially all deposited solids from each zone during each pass of said bridge.

4. The combination as defined in claim 3, in which each eduction segment includes a horizontal tube and a vertical tube defining passageways and in which at least one of said tubes in the respective eduction means defines passageways of different sizes in the respective eduction segments to provide said range of flow capacity.

5. The combination as defined in claim 3, in which each eduction segment includes a horizontal tube having a plurality of spaced openings defining a combined total area for receiving solids and in which the total area of the respective eduction segments is varied to provide said range of flow capacity.

6. The combination as defined in claim 5, in which the spaced openings of each horizontal tube are of varying size to accommodate a substantially constant hydraulic flow rate through the respective openings in a given tube.

7. The combination as defined in claim 5, in which the combined total area of said openings is progressively decreased in each of said eduction means between the inlet and the outlet means.

8. In a liquid clarification apparatus including a rectangular tank having longitudinal and transverse walls with the spacing between said longitudinal walls being substantially less than the spacing between said transverse walls, one longitudinal wall having spaced openings defining inlet means, outlet means adjacent said other longitudinal wall so that liquid flows from said inlet means to said outlet means while solids are deposited in varying depth layer on the tank bottom, sludge removal means comprising a bridge supported on said tank for movement perpendicular to the direction of flow of liquid in the tank between the inlet and outlet means; means for reciporcating said bridge; a plurality of eduction segments supported on said bridge at longitudinally spaced locations, said eduction segments dividing said tank bottom into a plurality of zones; and means associated with each eduction segments for removing varying amounts of settled solids from the respective zones of the tank bottom to allow removal of substantially the entire varying depth layer during each pass of the bridge over an area of the tank.

* * * * *